United States Patent
Lindoff et al.

(10) Patent No.: US 9,801,193 B2
(45) Date of Patent: *Oct. 24, 2017

(54) METHOD, COMPUTER PROGRAM, CONTROLLER AND NETWORK NODE

(71) Applicant: Telefonaktiebolaget LM Ericsson (publ), Stockholm (SE)

(72) Inventors: Bengt Lindoff, Bjärred (SE); Bo Hagerman, Tyresö (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,417

(22) Filed: Feb. 28, 2017

(65) Prior Publication Data

US 2017/0181174 A1 Jun. 22, 2017

Related U.S. Application Data

(63) Continuation of application No. 14/432,054, filed as application No. PCT/EP2015/052515 on Feb. 6, 2015, now Pat. No. 9,668,268.

(51) Int. Cl.
*H04W 72/08* (2009.01)
*H04B 17/318* (2015.01)
(Continued)

(52) U.S. Cl.
CPC ........ *H04W 72/082* (2013.01); *H04B 17/318* (2015.01); *H04W 24/08* (2013.01); *H04W 72/0453* (2013.01)

(58) Field of Classification Search
CPC ............... H04W 72/082; H04W 24/08; H04W 72/0453; H04B 17/318
See application file for complete search history.

(56) References Cited

U.S. PATENT DOCUMENTS

| 5,345,598 A | 9/1994 | Dent |
| 6,438,356 B1 | 8/2002 | Lilja et al. |

(Continued)

FOREIGN PATENT DOCUMENTS

| CN | 103858355 A | 6/2014 |
| GB | 2508383 A | 6/2014 |

*Primary Examiner* — Min Jung
(74) *Attorney, Agent, or Firm* — Coats & Bennett, PLLC

(57) ABSTRACT

A method of detecting interference caused by inter-modulation in a network node site comprising a set of network nodes for wireless communication capable of communication with a set of stations for wireless communication. The stations are wireless transceiver devices and communication from the network node to any of the stations is considered to be downlink communication and communication from any of the stations is considered to be uplink communication. The method comprises determining a received input signal interference level on at least a part of communication resources for uplink communication, determining a transmitted signal level on at least a part of communication resources for downlink communication, wherein the at least part of communication resources for downlink communication corresponds in time with the at least part of communication for uplink communication, correlating the determined received input signal interference level and the determined transmitted signal level at corresponding time instants to determine a correlation, and determining whether significant interference caused by inter-modulation is present based on the correlation. A computer program, a controller and a network node are also disclosed.

22 Claims, 4 Drawing Sheets

(51) Int. Cl.
*H04W 72/04* (2009.01)
*H04W 24/08* (2009.01)

(56) References Cited

U.S. PATENT DOCUMENTS

| | | |
|---|---|---|
| 6,868,277 B1 | 3/2005 | Cerwall et al. |
| 8,401,507 B2 | 3/2013 | Hillery et al. |
| 8,837,401 B2 | 9/2014 | Immonen et al. |
| 9,025,478 B2 | 5/2015 | Jung et al. |
| 2005/0063487 A1 | 3/2005 | Sayegh |
| 2009/0318087 A1 | 12/2009 | Mattila et al. |
| 2012/0236736 A1 | 9/2012 | Frank et al. |
| 2013/0194938 A1 | 8/2013 | Immonen et al. |
| 2013/0194984 A1 | 8/2013 | Cheng et al. |
| 2013/0310023 A1* | 11/2013 | Bevan .................. H04B 1/1027 455/423 |
| 2013/0322395 A1 | 12/2013 | Kazmi et al. |
| 2014/0153418 A1* | 6/2014 | Hariharan ............. H04W 24/10 370/252 |
| 2015/0036514 A1 | 2/2015 | Zhu et al. |
| 2015/0188587 A1* | 7/2015 | Imamura ........... H04W 52/0229 455/226.2 |
| 2015/0257165 A1* | 9/2015 | Gale .................... H04B 1/1036 370/329 |
| 2016/0006468 A1* | 1/2016 | Gale ..................... H04B 1/123 455/296 |
| 2016/0156422 A1 | 6/2016 | Lindoff et al. |
| 2016/0301436 A1 | 10/2016 | Zou et al. |
| 2016/0322995 A1 | 11/2016 | Bevan et al. |

* cited by examiner

METHOD, COMPUTER PROGRAM, CONTROLLER AND NETWORK NODE

This application is a continuation of U.S. application Ser. No. 14/432,054, filed 27 Mar. 2015, which was the National Stage of International Application No. PCT/EP2015/052515, filed 6 Feb. 2015, the disclosures of all of which are incorporated by reference herein in their entirety.

TECHNICAL FIELD BACKGROUND

The present invention generally relates to methods for a network node, a controller, a network node, and a computer program for implementing the method. In particular, the present invention relates to detecting interference caused by inter-modulation.

BACKGROUND

In wireless communication systems, interference by radio frequency (RF) transmitters for RF communication systems may become an issue.

The purpose of a transmitter in a digital wireless communication system is to convert a digital low-frequency baseband signal into an RF signal while preserving the modulation, and thereby the baseband information. In a full duplex system, a radio receives and transmits information simultaneously, which may be performed according to frequency duplex division (FDD), i.e. the radio transmits on one frequency and receives on another frequency. This means that, despite the fact that receive (RX) and transmit (TX) signals are spaced in frequency by a duplex distance, distortion products caused by nonlinearities in the transmitter may fall into the receive band and raise the over-all receiver noise figure, as well as discomply with a transmit spectrum mask. In order to reduce this effect, external cavity filters may be used in radio base stations (RBS) to filter out unwanted components outside wanted transmission band. However, intermodulation products caused by multiple transmitted signals, e.g. own TX signal in combination with an interferer signal, may also position unwanted tones in the receive band and thus degrade the receiver signal-to-noise-ratio (SNR). These unwanted tones are not possible to filter out by frequency filtering and they are thus to be handled by the receiver.

In a multi operator FDD RBS site solution, each operator uses a unique paired spectrum and the spectrum parts thus become separated in frequency not to interfere with each other's operations. There is no joint scheduling required among the operators, resulting in that simultaneous transmissions may occur. However, due to non-linear effects caused by for instance excitation of ferromagnetic materials or other physical properties, e.g. metal oxidation, mechanical disruptions, etc., passive intermodulation (PIM) products may be reflected back to or within the RBS site and fall into one of the operator's receive band and cause desensitization. As a result, the created PIM products caused by the multi operator transmissions may result in lowered received uplink SNR for some scenarios. The problem may also arise in the case when the same operator uses two different carrier frequencies, e.g. operating in carrier aggregation setup, in any direction. The problem may also affect or be affected by frequencies used for time division duplex (TDD) upon such relations between frequencies.

A normal operation to handle such problems would be to send a service technician to the RBS site to try to find the cause and replace or mend the causing element. However, such an operation may take a while, and there may be a not fully functioning RBS for a longer or shorter time.

In the case when two FDD downlink bands are separated by the same frequency distance as the duplex distance for one of the FDD receiver frequencies, third order PIM products may become collocated within a receive band without the possibility to be suppressed by filtering as discussed above. As a result, the noise level of the affected receiver will increase and lower received SNR in the uplink.

An example is illustrated in FIG. 1 where two transmitted signals 100, 102, for example 3GPP frequency band 29 and band 17, from the same RBS give rise to a PIM product 104, in this case due third order intermodulation, i.e. at $2 \cdot f1 - f2$, where f1 is the frequency of transmission in B17 and f2 is the transmission frequency in band 29, falling into the receive band 106 of band 17. As a result, in the band 17 the receiver will lower its sensitivity and face reduced coverage. Continuing this example with reference to FIG. 2, a base station 200 is operating a cell 202. The lowered sensitivity will decrease the possible coverage of the cell to a limited coverage 204. This could potentially lead to dropped connections or limited application coverage as illustrated by UE A 206 in FIG. 2, while for UEs closer to the network node 200, e.g. UE B 208, the communication may still work. This may lead to the operator missing traffic (to be billed) and/or less satisfaction by subscribers.

This may become more and more of a problem the more bands that are available, since with the more bands there will be larger risks for co-sited RBSs for different operators, which may create PIM affecting any of the operators' receive bands. For the sake of brevity and easier understanding, the issue has been demonstrated above where inter-modulation is caused by two frequencies, but the similar effects may arise from further used frequencies, and used frequencies inter-modulating with inter-modulation products, and so on. That is, the more frequencies used at a network node site, the more likely is it that an intermodulation product affects a receive band.

It is therefore a desire to detect such situations to be able to handle them.

SUMMARY

The invention is based on the understanding that the above situation may or may not occur depending on situations that are hard to predict, e.g. the case of intermodulation caused by occurred metal oxidation. To estimate whether the situation has occurred, the inventors suggest an approach including correlating collected statistics.

According to a first aspect, there is provided a method of detecting interference caused by inter-modulation in a network node site comprising a set of network nodes for wireless communication capable of communication with a set of stations for wireless communication. The stations are wireless transceiver devices and communication from the network node to any of the stations is considered to be downlink communication and communication from any of the stations is considered to be uplink communication. The method comprises determining a received input signal interference level on at least a part of communication resources for uplink communication, determining a transmitted signal level on at least a part of communication resources for downlink communication, wherein the at least part of communication resources for downlink communication corresponds in time with the at least part of communication resources for uplink communication, correlating the determined received input signal interference level and the determined transmitted signal level at corresponding time instants to determine a correlation, and determining whether significant interference caused by inter-modulation is present based on the correlation.

The method may further comprise selecting the at least a part of communication resources for uplink communication.

The at least a part of communication resources for uplink communication may exclude any data transmission.

The at least a part of communication resources for uplink communication may exclude any data transmission by not scheduling any of the set of stations to transmit any uplink communication to any of the network nodes during the at least a part of communication resources.

The at least a part of communication resources for uplink communication may exclude any data transmission by selecting the at least a part of communication resources to be at times when the set of stations only transmits reference signals.

The transmitted signal may be provided at a selected level for each instant. The selected level may be at substantially full transmit power level for the network node transmitting the signal for at least some instant. The selected level may be at substantially minimum transmit power level for the network node transmitting the signal for at least some instant. Significant interference caused by inter-modulation may be considered present based on the correlation when correlation between substantially full transmit power level for the network node and a higher received input signal interference level and correlation between substantially minimum transmit power level for the network node are above a threshold.

The method may comprise providing the determined received input signal interference level and transmitted signal level to a statistics mechanism, and receiving the statistics to be correlated from the statistics mechanism.

The method may comprise taking a predetermined action when significant interference caused by inter-modulation is determined to be present.

According to a second aspect, there is provided a computer program comprising instructions which, when executed on a processor of a communication apparatus, causes the communication apparatus to perform the method according to the first aspect.

According to a third aspect, there is provided a controller arranged to operate with a network node site comprising a set of network nodes for wireless communication capable of communication with a set of stations for wireless communication. The stations are wireless transceiver devices and communication from the network node to any of the stations is considered to be downlink communication and communication from any of the stations is considered to be uplink communication. The controller comprises an interface level detector arranged to determine a received input signal interference level on at least a part of communication resources for uplink communication, a transmit signal level monitor arranged to determine a transmit signal level on at least a part of communication resources for downlink communication, wherein the at least part of communication resources for downlink communication corresponds in time with the at least part of communication for uplink communication, a correlator arranged to correlate the determined received input signal interference level and the determined transmitted signal level at corresponding time instants to determine a correlation, and an analyser arranged to determine whether significant interference caused by inter-modulation is present based on the correlation.

The controller may further comprise a scheduler arranged to select the at least a part of communication resources for uplink communication.

The at least a part of communication resources for uplink communication may exclude any data transmission.

The at least a part of communication resources for uplink communication may exclude any data transmission by disabling scheduling of any of the set of stations to transmit any uplink communication to any of the network nodes during the at least a part of communication resources.

The at least a part of communication resources for uplink communication may exclude any data transmission by selecting the at least a part of communication resources to be at times when the set of stations only transmits reference signals.

The controller may be arranged to provide control such that the transmitted signal is provided at a selected level for each instant. The selected level may be at substantially full transmit power level for the network node transmitting the signal for at least some instant. The selected level may be at substantially minimum transmit power level for the network node transmitting the signal for at least some instant. The analyser may be arranged to consider significant interference caused by inter-modulation to be present based on the correlation when correlation between substantially full transmit power level for the network node and a higher received input signal interference level and correlation between substantially minimum transmit power level for the network node are above a threshold.

The controller may comprise an interface arranged to provide the determined received input signal interference level and transmitted signal level to a statistics mechanism, and receive the statistics to be correlated from the statistics mechanism.

The controller may be arranged to enable a predetermined action when significant interference caused by inter-modulation is determined to be present.

According to a fourth aspect, there is provided a network node for wireless communication capable of communication with a set of stations for wireless communication comprising a controller according to the third aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Methods of detecting interference, a network, NW, node and computer programs for the same are disclosed below. The interference on topic is caused by inter-modulation in a NW node, or NW node site comprising a plurality of co-located NW nodes, for wireless communication with a set of stations for wireless communication. The term "co-located" should in this context include that the network nodes are located in the same spot or housing, as well at being in close neighbourhood such that signals from the network nodes may cause intermodulation products as discussed above. A station in this context may for example be a user equipment, UE, a modem, a cellphone, a computer or, any electric or electronic device capable of wireless communication with a NW node. More and more items we previously knew as rather simple objects are now capable of this, which has, and will, provide for some of the great improvements in many fields, even outside the conventional telecommunication industry. Examples are sensors, machines, medical equipment, monitoring devices, etc. that has been enhanced by being able to wirelessly communicate with wireless nodes of different wireless communication systems.

In this disclosure below, embodiments are exemplified within an 3GPP LTE context for the sake of easier understanding, but the invention is not limited to that Radio Access Technology (RAT). Other RATs, such as any of the commonly used technologies for public land mobile networks, may benefit from the invention in a similar way.

Figure 3:
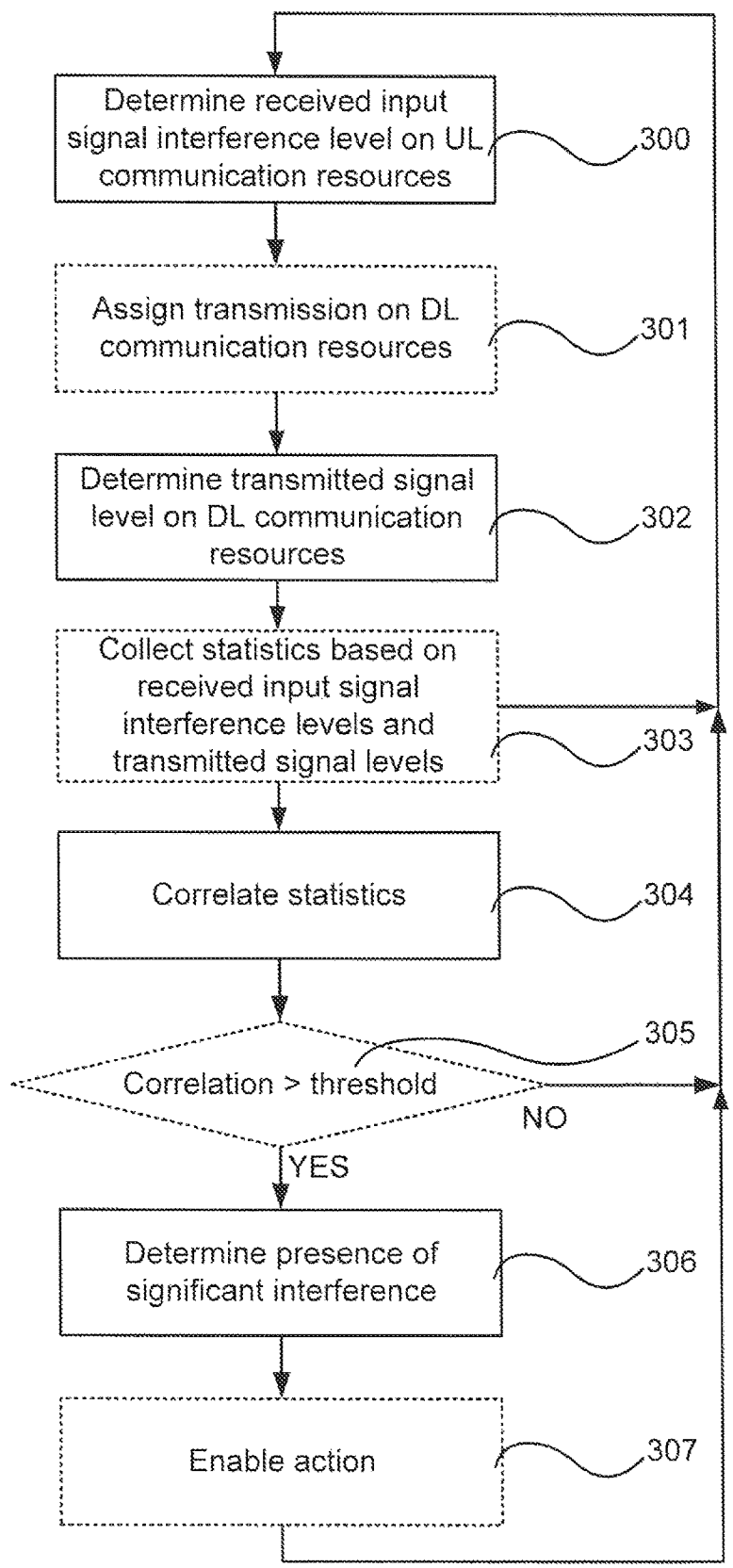
FIG. 3 is a flow chart illustrating a method of detecting interference caused by inter-modulation in a network node for wireless communication according to an embodiment.

FIG. 3 is a flow chart illustrating methods of embodiments. The method includes determining 300 received input signal interference level on uplink, UL, communication resources. The UL communication resources may correspond to an entire transmission time interval or selected parts thereof. The selected parts thereof may be selected such that those parts do not include any data transmission which facilitates the determination of the interference level since the nominal signal level of the received signal then is reasonably known. If determination is to be made on signals including data transmissions, the determination may rely on statistics or other information to estimate the interference level. The determination 302 of interference level may also include "active" silence, i.e. the method may arrange that no schedule for an uplink transmission grant for the stations is made during a particular transmission time interval, wherein all of the received signal is some kind of interference.

The method also includes determining 302 a transmitted signal level on at least a part of communication resources for downlink communication. The at least part of communication resources for downlink communication should correspond in time with the at least part of communication for uplink communication to be able to determine if the transmitted signal affects the interference level of the received signal. The corresponding time may for example be defined by corresponding subframes or transmission time intervals.

Both the received signal and the transmitted signal should be known and/or under control of the entity performing the method. This may be the case when the entity is one network node. This may also be the case when more than one network node, where one does the receiving and another does the transmitting referred to above, are involved but are under control by e.g. a common controller. A network node in this context may operate on one or more frequency bands, e.g. one frequency band for both receiving and transmitting, one frequency band for transmitting and receiving and another frequency band for transmitting or receiving, or one or more frequency bands for respective transmitting and receiving. Thus, the network node(s) may operate in time division duplex, TDD, frequency division duplex, FDD, and/or with carrier aggregation, wherein different relations may occur when a received channel may be interfered by inter-modulation from a transmitted channel in a network node site comprising a set of network nodes, i.e. one or more, capable of wireless communication with a set of stations for wireless communication.

For determining such relations where the received signal is interfered by inter-modulation introduced by a transmitted signal which is under control by the entity performing the method, the method correlates 304 statistics from the determined received input signal interference level and the determined transmitted signal level. This may be performed for any relations between received signals and transmitted signals which are under control by the entity performing the method.

Based on the correlations, it is determined 306 whether significant interference is caused by inter-modulation introduced by the transmitted signal which is under control by the entity performing the method. If such significant interference is determined present, a predetermined action may be taken 307. The predetermined action may for example include assigning communication resources such that communication is less affected by the interference.

The determination whether significant interference is caused, as stated above, may include comparing 305 a correlation metric value provided by the correlation 304 with a threshold, wherein a correlation metric value exceeding the threshold indicates that the significant interference is present while if the correlation metric value is below the threshold, the method continues to monitor 300, 302 received input signal interference levels and transmit signal levels.

Statistics based on the received input signal interference levels and transmitted signal levels may be collected 303 over time, as indicated by the arrow returning to the determination step 300, to provide sufficient statistics to correlate 304. The statistics may be collected 303 locally or may be collected 303 by aid of remote elements comprising database and processing means. For example, the element performing the method may comprise an interface arranged to provide the determined received input signal interference level and transmitted signal level to a statistics mechanism of the remote element, or a statistics mechanism of the element performing the method. For making the correlation the correlation 304, the statistics to be correlated are received from the statistics mechanism and the correlations are done 304 thereon.

The monitoring and building of statistics may for example be an ongoing process as transmissions and receptions are performed in the network node site while the correlating and determining may be performed periodically. However, the monitoring and building of statistics may also be made periodically, wherein the period for monitoring may be equal or shorter than the period for the correlating and determining whether significant interference is present.

To enhance the statistics, it may be desired to provide a variety of transmit signal levels to the monitored set. Therefore, transmission on the DL communication resources may be assigned 301 such that this variation is achieved. This may comprise selecting the transmit level to e.g. substantially full transmit power level for the network node transmitting the signal for at least some of the time instants, and substantially minimum transmit power level for the network node transmitting the signal for at least some of the time instants. Full transmit power level may for example be provided by ensuring that the communication resources, which may be defined by time, frequency and/or code, are completely filled, which may require filling with dummy information. Minimum transmit power level may for example be provided by only transmitting mandatory reference signals etc. and possibly with reduced power level, i.e. not scheduling any traffic on the communication resources in question. The variation may also be achieved by normal variation in transmissions. The determination 302 of transmitted signal level may for example be provided from information on utilization of the communication resources.

Figure 1:
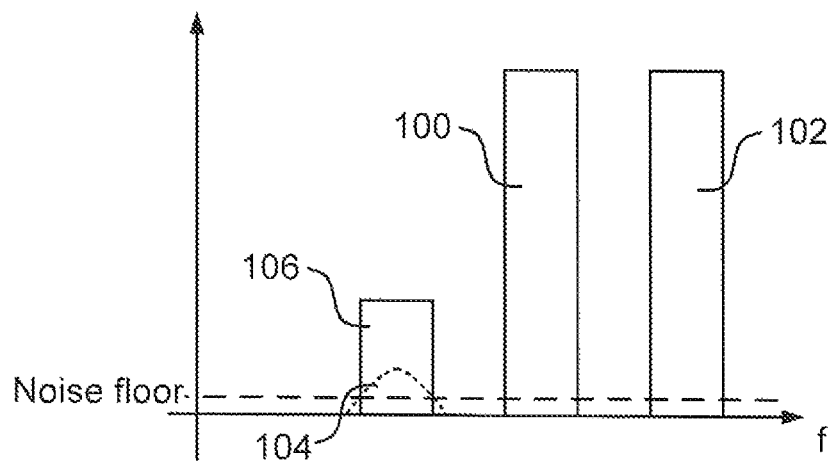
FIG. 1 schematically illustrates how inter-modulation issues may degrade a signal.
Figure 2:
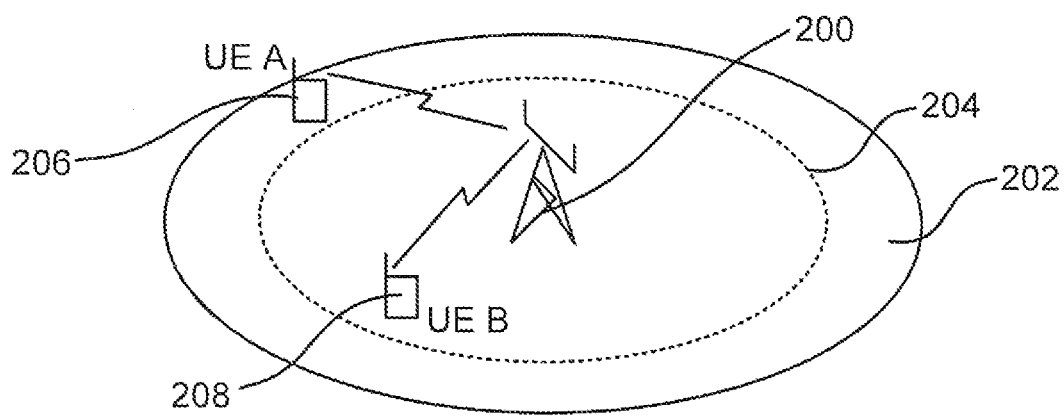
FIG. 2 schematically illustrates a base station operating a cell and how inter-modulation degradation may limit the range of the base station.
Figure 4:
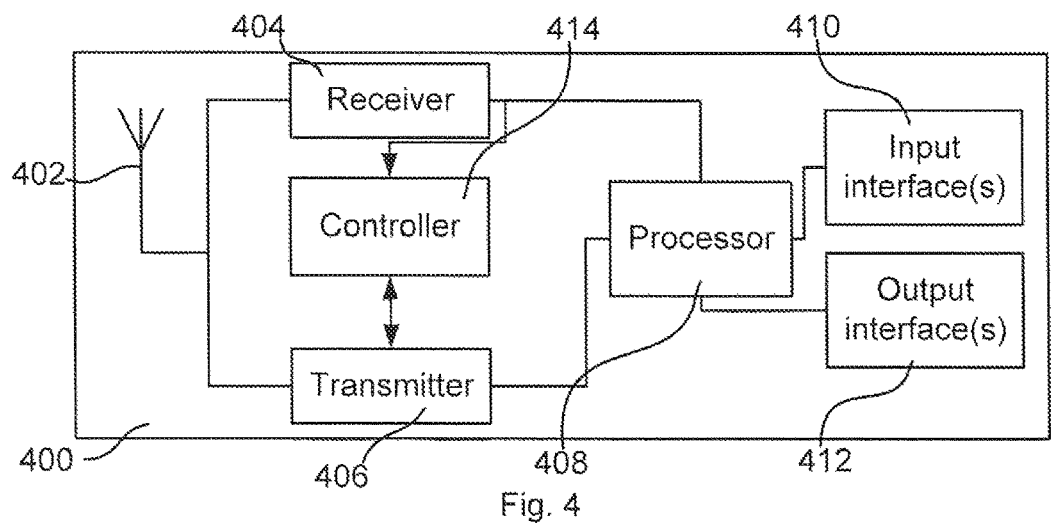
FIG. 4 is a block diagram schematically illustrating a network node according to an embodiment.

FIG. 4 is a block diagram schematically illustrating a NW node 400 according to an embodiment. The NW node 400 comprises an antenna arrangement 402, a receiver 404 connected to the antenna arrangement 402, a transmitter 406 connected to the antenna arrangement 402, a processing element 408 which may comprise one or more circuits, one or more input interfaces 410 and one or more output interfaces 412. The interfaces 410, 412 can be user interfaces and/or signal interfaces, e.g. electrical or optical. The NW node 400 is arranged to operate in a cellular communication network, e.g. as a base station operating a cell. In particular, by the processing element 408 being arranged to perform the embodiments demonstrated with reference to FIGS. 2 and 3, the NW node 400 is capable of detecting inter-modulation interference issues. The processing element 408 can also fulfill a multitude of tasks, ranging from signal processing to enable reception and transmission since it is connected to the receiver 404 and transmitter 406, executing applications, controlling the interfaces 410, 412, etc.

The NW node 400 comprises controller 414 arranged to handle some specific functions related to the method demonstrated above. The controller may be a separate element or be integrated in the processor 408. The controller 414 comprises an interference level detector arranged to detect a received input signal interference level on at least a part of communication resources for uplink communication in a uplink carrier frequency band. The interference level detector is thus connected to the receiver 404 to be able to gain levels and information for performing its task. The controller 414 further comprises a transmit signal level monitor arranged to determine a transmit signal level on at least a part of communication resources for downlink communication. The transmit signal level may be determined from output of the transmitter 406, or be determined based on inputs and settings provided to or within the transmitter 406. At least part of communication resources for downlink communication corresponds in time with the at least part of communication for uplink communication such that they may be analysed, as demonstrated above and also shown below. The controller 414 further includes a correlator arranged to correlate statistics from the determined received input signal interference level and the determined transmitted signal level, and an analyser arranged to determine whether significant interference caused by inter-modulation is present based on the correlation.

By these elements it is possible to determine whether the interference level indicates significant inter-modulation interference caused by transmissions made by the transmitter 406, i.e. by collecting statistics and performing correlation and evaluating them. The controller 414 may thus be considered to perform the steps 300 and 302 of FIG. 3 to enable collection of interference and signal levels for the statistics as demonstrated above, wherein the controller 414 is able to determine, by performing the correlations from the collected statistics, if significant inter-modulation issues caused by signals transmitted by the transmitter 406 exist. The controller 414 may further be arranged to, if "active" silence is required on the uplink for the measurements, arrange that no schedule for an uplink transmission grant for the stations is made. The uplink transmission grant is valid for a future TTI. The controller 414, which is connected to the transmitter 406, may further be arranged to avoid the uplink transmission grant to the stations, and to allocate a transmit level on the downlink carrier frequency band at the future TTI such that measurements to collect desired statistics on inter-modulation interference is enabled on the uplink carrier frequency band. The controller 414 is illustrated as a separate functional element, but may be implemented within the processing element 408 in some embodiments. This will be further demonstrated with reference to FIG. 7.

Figure 5:
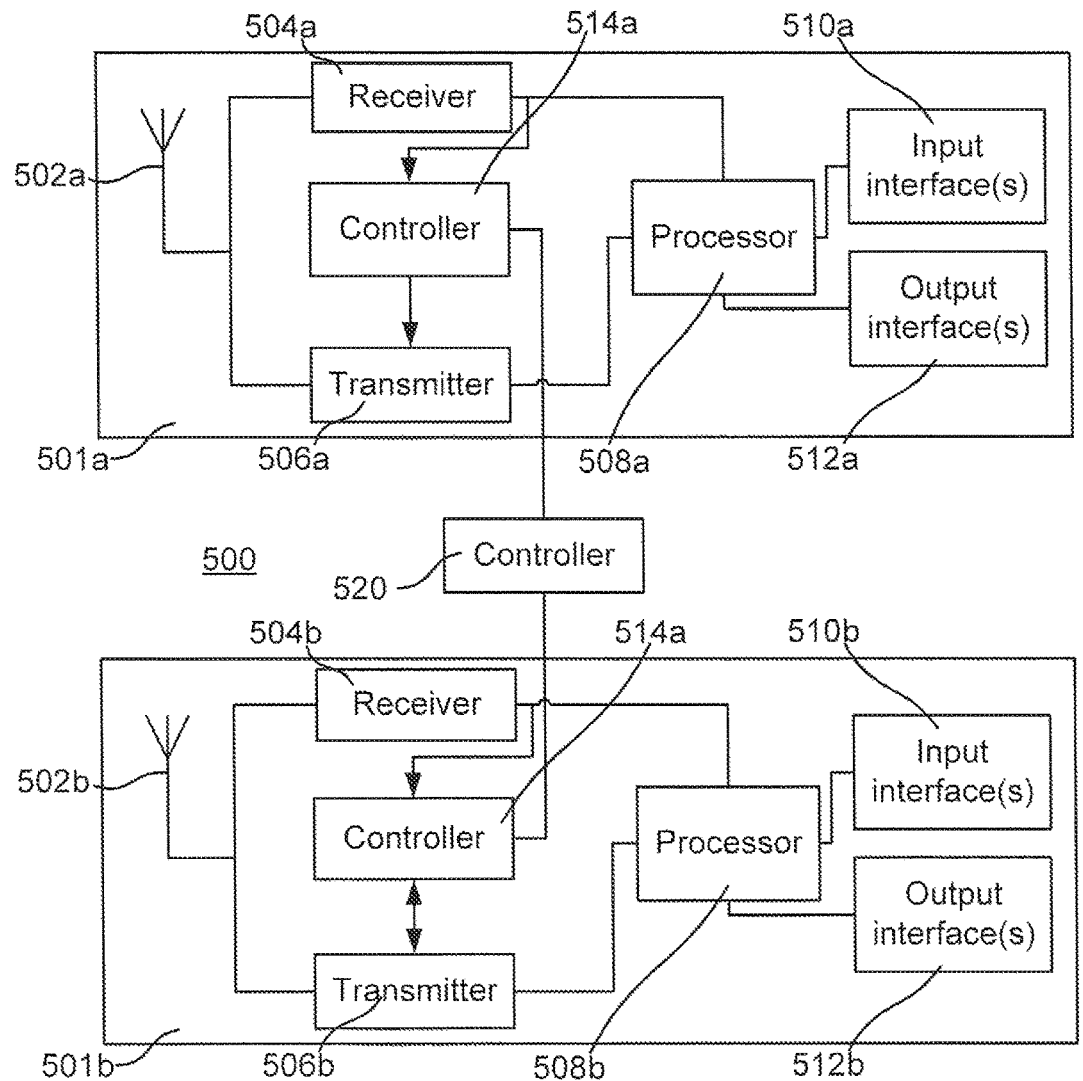
FIG. 5 is a block diagram schematically illustrating a network node site according to an embodiment.

FIG. 5 is a block diagram schematically illustrating a NW node site 500 according to an embodiment. The NW node site 500 comprises two or more co-located NW nodes 501a, 501b and a NW node site controller 520. The NW nodes 501a, 501b resembles the NW node 400 demonstrated with reference to FIG. 4. That is, the NW nodes 501a, 501b each comprises an antenna arrangement 502a, 502b, a receiver 504a, 504b connected to the antenna arrangement 502a, 502b, a transmitter 506a, 506b connected to the antenna arrangement 502a, 502b, a processing element 508a, 508b which may comprise one or more circuits, one or more input interfaces 510a, 510b and one or more output interfaces 512a, 512b. The antenna arrangements 502a, 502b may be a common antenna arrangement for the network nodes 501a, 501b. The interfaces 510a, 510b, 512a, 512b can be user interfaces and/or signal interfaces, e.g. electrical or optical. The NW nodes 501a, 501b may be arranged to operate in a cellular communication network, e.g. as a base station operating a cell. The processing element 508a, 508b can also fulfill a multitude of tasks, ranging from signal processing to enable reception and transmission since it is connected to the receiver 504a, 504b and transmitter 506a, 506b, executing applications, controlling the interfaces 510a, 510b, 512a, 512b, etc. The NW nodes 501a, 501b each may comprise a controller 514a, 514b arranged to detect an interference level on the uplink carrier frequency band for a subset of stations of the set of stations. The controllers 514a, 514b are thus connected to the receivers 504a, 504b, respectively, to be able to gain levels and information for performing its task. The controllers 514a, 514b are illustrated as separate functional elements, but may be implemented within the processing elements 508a, 508b or in the common NW node site controller 520 in some embodiments. The controllers 514a, 514b may alternatively be considered to be more or less only interfaces towards the NW node site controller 520 which may perform the activities. Alternatively, the NW node site controller 520 may be considered to be more or less only an interface between the controllers 514a, 514b, which may perform the activities and exchange necessary information via the NW node site controller 520, i.e. the functions of the NW node site controller 520 is distributed wherein the NW node site controller 520 per se, at least partially, may be regarded as distributed, e.g. between controllers 514a, 514b, or processing elements 508a, 508b.

In the following, the functions related to inter-modulation interference detection will be described from the point of view that a first NW node 501a transmits a DL signal which may interfere with an UL signal to a second NW node 501b. This applies of course the other way too, but for the sake of brevity, the explanation is made from the above referenced point of view wherein the skilled reader readily understands how it will work both ways.

The second NW node 501b is arranged to detect an interference level on a transmission received on an associated uplink carrier frequency band for a subset of stations or UEs of a set of stations or UEs associated with the second NW node 501b. By these elements it is possible to determine whether the interference level indicates significant inter-modulation interference caused by transmissions made by the transmitter 506a, i.e. by collecting statistics and performing correlation and evaluating them. The controller(s), according to any of the task distributions demonstrated above, may thus be considered to perform the method according to any of the embodiments demonstrated with reference to FIG. 3 to enable collection of interference and signal levels for the statistics as demonstrated above, wherein the controller(s) is/are able to determine, by performing the correlations from the collected statistics, if significant inter-modulation issues caused by signals transmitted by the transmitter 506a exist. The controller(s) may further be arranged to, if "active" silence is required on the uplink for the measurements, arrange than no schedule for an uplink transmission grant for the stations is made. The uplink transmission grant is valid for a future TTI. The controller 514b, which is connected to the transmitter 506b, may further be arranged to avoid the uplink transmission grant to the stations, and to allocate a transmit level on the downlink carrier frequency band at the future TTI such that measurements to collect desired statistics on inter-modulation interference is enabled on the uplink carrier frequency band.

Figure 6:
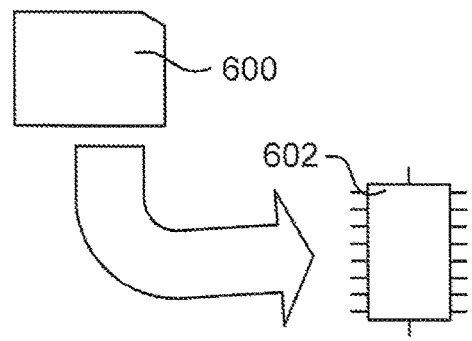
FIG. 6 schematically illustrates a computer-readable medium and a processing device.

The methods according to the present invention is suitable for implementation with aid of processing means, such as computers and/or processors, especially for the case where any of the processing elements 408, 414, 508a, 508b, 514a, 514b, 520 demonstrated above comprises a processor handling determination of inter-modulation interference. Therefore, there is provided computer programs, comprising instructions arranged to cause the processing means, processor, or computer to perform the steps of any of the methods according to any of the embodiments described with reference to FIG. 3. The computer programs preferably comprises program code which is stored on a computer readable medium 600, as illustrated in FIG. 6, which can be loaded and executed by a processing means, processor, or computer 602 to cause it to perform the methods, respectively, according to embodiments of the present invention, preferably as any of the embodiments described with reference to FIG. 3. The computer 602 and computer program product 600 can be arranged to execute the program code sequentially where actions of the any of the methods are performed stepwise. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements.

Figure 7:
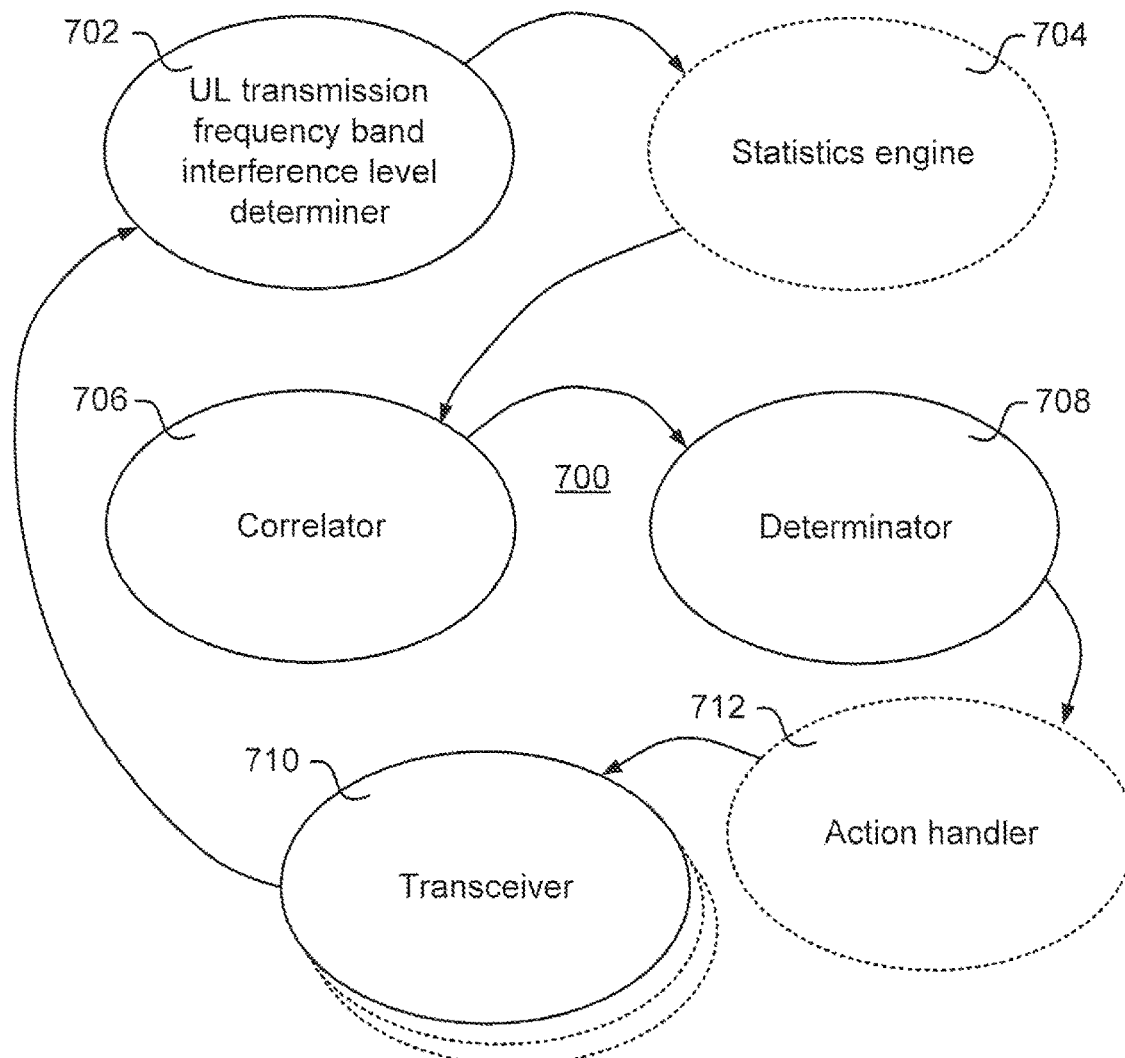
FIG. 7 schematically illustrates functional elements for handling interference caused by inter-modulation in a network node for wireless communication according to an embodiment.

FIG. 7 schematically illustrates functional elements for detecting interference caused by inter-modulation in a NW node or NW node site for wireless communication according to an embodiment. The technology demonstrated above is suitably implemented as a combination of software and hardware, where the software parts may be performed at one dedicated processor or distributed between two or more processors, which sometimes may belong to different entities, e.g. between NW nodes of a NW node site. FIG. 7 therefore describes an apparatus 700 from a functional point of view where the distribution between processors is arbitrary. The apparatus 700, which may be a NW node or a NW node site as demonstrated with reference to FIGS. 4 and 5, comprises an UL carrier frequency band interference level determiner 702, which based on input from one transceiver 710 determines an interference level for an UL carrier frequency band. The determined interference level is provided to statistics engine 704 Further, transmit levels are sent from the transceiver 710 or another transceiver in possession of the operator to the statistics engine 704. The statistics engine 704 collects statistics on interference levels and transmit levels, as demonstrated above. The statistics engine 704 may be internal or external to the network node. The statistics engine 704 provides statistics to a correlator 706 which correlates transmit levels to interference levels at corresponding time instants. Correlation metric values are provided to a determinator 708, which from the correlation metric values determines whether a transmitter in possession of the operator causes significant inter-modulation interference reaching the receiver. If such significant inter-modulation interference is determined to be present, an action handler 712 may be involved to apply some action for reducing impact of the interference. The action handler 712 may affect operation of the transceiver(s).

What is claimed is:

1. A method of detecting interference caused by inter-modulation in a network node site comprising a set of network nodes for wireless communication capable of communication with a set of stations for wireless communication, wherein the stations comprise wireless transceiver devices, wherein communication from the network node to any of the stations comprises downlink communication, and wherein communication from any of the stations comprises uplink communication, the method comprising:
   determining a received input signal interference level on at least a part of communication resources for uplink communication;
   determining a transmitted signal level on at least a part of the communication resources for downlink communication, wherein the at least a part of the communication resources for the downlink communication corresponds in time with the at least a part of the communication resources for the uplink communication;
   correlating the determined received input signal interference level and the determined transmitted signal level at corresponding time instants to determine a correlation; and
   determining whether significant interference caused by inter-modulation is present based on a comparison of a correlation metric value of the correlation with a threshold.

2. The method of claim 1, further comprising selecting the at least a part of the communication resources for the uplink communication.

3. The method of claim 1, wherein the at least a part of the communication resources for the uplink communication does not include any user data.

4. The method of claim 3, wherein the at least a part of the communication resources for the uplink communication does not include any user data by not scheduling any of the set of stations to transmit any uplink communication to any of the network nodes during the at least a part of the communication resources for the uplink communication.

5. The method of claim 3, wherein the at least a part of the communication resources for the uplink communication does not include any user data by selecting the at least a part of the communication resources for the uplink communication to be at times when the set of stations only transmits reference signals.

6. The method of claim 1, wherein the transmitted signal is provided at a selected level for each instant.

7. The method of claim 6, wherein the selected level is at substantially full transmit power level for the network node transmitting the signal for at least some instant.

8. The method of claim 6, wherein the selected level is at substantially minimum transmit power level for the network node transmitting the signal for at least some instant.

9. The method of claim 1, wherein significant interference caused by inter-modulation is considered present based on the correlation when the correlation exceeds a threshold.

10. The method of claim 1, further comprising taking a predetermined action when significant interference caused by inter-modulation is determined to be present.

11. A computer program product stored in a non-transitory computer readable medium for controlling a processor circuit of a communication apparatus, the computer program product comprising software instructions which, when run on the processor circuit of the communication apparatus, causes the communication apparatus to:
determine a received input signal interference level on at least a part of communication resources for uplink communication;
determine a transmitted signal level on at least a part of the communication resources for downlink communication, wherein the at least a part of the communication resources for the downlink communication corresponds in time with the at least a part of the communication resources for the uplink communication;
correlate the determined received input signal interference level and the determined transmitted signal level at corresponding time instants to determine a correlation; and
determine whether significant interference caused by inter-modulation is present based on a comparison of a correlation metric value of the correlation with a threshold.

12. A controller circuit configured to operate with a network node site comprising a set of network nodes for wireless communication capable of communication with a set of stations for wireless communication, wherein the stations comprise wireless transceiver devices, wherein communication from the network node to any of the stations comprises downlink communication, and wherein communication from any of the stations comprises uplink communication, the controller circuit comprising:
an interference level detector circuit configured to determine a received input signal interference level on at least a part of communication resources for uplink communication;
a transmit signal level monitor circuit configured to determine a transmit signal level on at least a part of communication resources for downlink communication, wherein the at least a part of the communication resources for the downlink communication corresponds in time with the at least a part of the communication resources for the uplink communication;
a correlators circuit configured to correlate the determined received input signal interference level and the determined transmitted signal level at corresponding time instants to determine a correlation; and
an analyser circuit configured to determine whether significant interference caused by inter-modulation is present based on a comparison of a correlation metric value of the correlation with a threshold.

13. The controller of claim 12, further comprising a scheduler circuit configured to select the at least a part of the communication resources for the uplink communication.

14. The controller of claim 12, wherein the at least a part of the communication resources for the uplink communication does not include any user data.

15. The controller of claim 14, wherein the at least a part of the communication resources for the uplink communication does not include any user data by disabling scheduling of any of the set of stations to transmit any uplink communication to any of the network nodes during the at least a part of the communication resources for the uplink communication.

16. The controller of claim 14, wherein the at least a part of the communication resources for the uplink communication does not include any user data by selecting the at least a part of the communication resources for the uplink communication to be at times when the set of stations only transmits reference signals.

17. The controller of claim 12, further configured to provide control such that the transmitted signal is provided at a selected level for each instant.

18. The controller of claim 17, wherein the selected level is at substantially full transmit power level for the network node transmitting the signal for at least some instant.

19. The controller of claim 17, wherein the selected level is at substantially minimum transmit power level for the network node transmitting the signal for at least some instant.

20. The controller of claim 12, wherein the analyser circuit is configured to consider significant interference caused by inter-modulation to be present based on the correlation when correlation exceeds a threshold.

21. The controller of claim 12, further configured to enable a predetermined action when significant interference caused by inter-modulation is determined to be present.

22. A network node for wireless communication capable of communication with a set of stations for wireless communication, wherein the stations comprise wireless transceiver devices, wherein communication from the network node to any of the stations comprises downlink communication, and wherein communication from any of the stations comprises uplink communication, wherein the network node comprises a controller circuit comprising:
an interference level detector circuit configured to determine a received input signal interference level on at least a part of communication resources for uplink communication;
a transmit signal level monitor circuit configured to determine a transmit signal level on at least a part of communication resources for downlink communication, wherein the at least a part of the communication resources for the downlink communication corresponds in time with the at least a part of the communication resources for the uplink communication;
a correlators circuit configured to correlate the determined received input signal interference level and the determined transmitted signal level at corresponding time instants to determine a correlation; and
an analyser circuit configured to determine whether significant interference caused by inter-modulation is present based on a comparison of a correlation metric value of the correlation with a threshold.

* * * * *